United States Patent
Kuo et al.

(10) Patent No.: US 9,791,680 B2
(45) Date of Patent: Oct. 17, 2017

(54) PROJECTION APPARATUS AND PROJECTION LENS

(71) Applicant: Coretronic Corporation, Hsin-Chu (TW)

(72) Inventors: Tao-Hung Kuo, Hsin-Chu (TW); Tzu-Yuan Lin, Hsin-Chu (TW); Hsin-Wen Tsai, Hsin-Chu (TW); Ching-Chuan Wei, Hsin-Chu (TW); Chuan-Te Cheng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/202,570

(22) Filed: Jul. 5, 2016

(65) Prior Publication Data

US 2017/0068077 A1    Mar. 9, 2017

(30) Foreign Application Priority Data

Sep. 4, 2015   (TW) .............................. 104129289 A

(51) Int. Cl.
  *G02B 9/00* (2006.01)
  *G02B 15/177* (2006.01)
  (Continued)

(52) U.S. Cl.
  CPC ......... *G02B 15/177* (2013.01); *G02B 13/009* (2013.01); *G02B 13/04* (2013.01); *G02B 13/16* (2013.01); *G03B 21/005* (2013.01)

(58) Field of Classification Search
  CPC .................................................... G02B 13/16
  (Continued)

(56) References Cited

U.S. PATENT DOCUMENTS 4,364,641 A    12/1982  Mogami
7,400,455 B2   7/2008   Sawamoto
(Continued)

FOREIGN PATENT DOCUMENTS

JP    2010128318 A  *  6/2010
JP    2011107269       6/2011
(Continued)

OTHER PUBLICATIONS

"Office Action of Taiwan Counterpart Application", dated May 25, 2016, p. 1-p. 4.

*Primary Examiner* — William Choi
(74) *Attorney, Agent, or Firm* — Jianq Chyun IP Office

(57) ABSTRACT

A projection lens disposed between a screen side and an image side and including a first lens group and a second lens group is provided. Refractive powers of the first lens group and the second lens group are respectively negative and positive. The first lens group includes a first lens, a second lens, and a third lens arranged in sequence from the screen side to the image side, and refractive powers thereof are respectively negative, negative, and positive. The second lens group is disposed between the first lens group and the image side and includes a fourth lens, a fifth lens, a sixth lens, a seventh lens, an eighth lens, a ninth lens, and a tenth lens arranged in sequence from the screen side to the image side, and refractive powers thereof are respectively positive, positive, negative, negative, negative, positive, and positive. A projection apparatus is provided.

20 Claims, 8 Drawing Sheets

(51) Int. Cl.
  *G02B 13/16* (2006.01)
  *G02B 13/04* (2006.01)
  *G02B 13/00* (2006.01)
  *G03B 21/00* (2006.01)

(58) Field of Classification Search
  USPC .............................................. 359/649–651
  See application file for complete search history.

(56) References Cited

U.S. PATENT DOCUMENTS

| | | |
|---|---|---|
| 8,000,023 B2 | 8/2011 | Chou et al. |
| 2002/0171942 A1 | 11/2002 | Narimatsu |
| 2002/0196560 A1 | 12/2002 | Endo |

FOREIGN PATENT DOCUMENTS

| | | |
|---|---|---|
| JP | 2013145408 | 7/2013 |
| JP | 2014067066 | 4/2014 |
| JP | 2014232248 | 12/2014 |
| TW | 201135278 | 10/2011 |
| TW | 201516458 | 5/2015 |
| TW | 1512329 | 12/2015 |

* cited by examiner

PROJECTION APPARATUS AND PROJECTION LENS

CROSS-REFERENCE TO RELATED APPLICATION

This application claims the priority benefit of Taiwan application serial no. 104129289, filed on Sep. 4, 2015. The entirety of the above-mentioned patent application is hereby incorporated by reference herein and made a part of this specification.

BACKGROUND OF THE INVENTION

Field of the Invention

The invention relates to a projection apparatus and a projection lens.

Description of Related Art

Optical quality of a projection lens has a critical impact on imaging quality of a projection apparatus. On the current market, the projection lens is mainly developed toward the design trend for miniaturization. Accordingly, in the highly competitive market, it has become one of important problems to be solved by developers as how to reduce weight and volume of the projection lens while maintaining optical quality of the projection lens.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a projection lens, which is small in size, light in weight, and has good/favorable optical quality.

The invention provides a projection apparatus, which has advantages of small size, light weight, and good/favorable imaging quality.

Other objects and advantages of the invention can be further illustrated by the technical features broadly embodied and described as follows.

In order to achieve at least one of the objects or other objects, an embodiment of the invention provides a projection apparatus including an illumination system, a light valve, and a projection lens. The illumination system is adapted to provide an illumination beam. The light valve is disposed on a transmitting path of the illumination beam, and adapted to convert the illumination beam into an image beam. The projection lens is disposed on a transmitting path of the image beam and between a screen side and an image side. The projection lens includes a first lens group and a second lens group. The first lens group has a negative refractive power, and includes a first lens, a second lens, and a third lens arranged in sequence from the screen side to the image side. Refractive powers of the first lens, the second lens, and the third lens are respectively negative, negative, and positive. The second lens group having a positive refractive power is disposed between the first lens group and the image side, and includes a fourth lens, a fifth lens, a sixth lens, a seventh lens, an eighth lens, a ninth lens, and a tenth lens arranged in sequence from the screen side to the image side. Refractive powers of the fourth lens, the fifth lens, the sixth lens, the seventh lens, the eighth lens, the ninth lens, and the tenth lens are respectively positive, positive, negative, negative, negative, positive, and positive.

In order to achieve at least one of the objects or other objects, an embodiment of the invention provides a projection lens which is adapted to be disposed between a screen side and an image side. The projection lens includes a first lens group and a second lens group. The first lens group has a negative refractive power, and includes a first lens, a second lens, and a third lens arranged in sequence from the screen side to the image side. Refractive powers of the first lens, the second lens, and the third lens are respectively negative, negative, and positive. The second lens group having a positive refractive power is disposed between the first lens group and the image side, and includes a fourth lens, a fifth lens, a sixth lens, a seventh lens, an eighth lens, a ninth lens, and a tenth lens arranged in sequence from the screen side to the image side. Refractive powers of the fourth lens, the fifth lens, the sixth lens, the seventh lens, the eighth lens, the ninth lens, and the tenth lens are respectively positive, positive, negative, negative, negative, positive, and positive.

In an embodiment of the projection apparatus and the projection lens of the invention, the first lens is an aspheric lens, and the second lens, the third lens, the fourth lens, the fifth lens, the sixth lens, the seventh lens, the eighth lens, the ninth lens, and the tenth lens are spherical lenses.

In an embodiment of the projection apparatus and the projection lens of the invention, the fifth lens and sixth lens form a cemented doublet lens, and the seventh lens, the eighth lens, and the ninth lens form a cemented triplet lens.

In an embodiment of the projection apparatus and the projection lens of the invention, the first lens group and the second lens group are adapted to move between the screen side and the image side so that the projection lens switches between a wide-end and a tele-end. A distance between the first lens group and the second lens group is DW at the wide-end and is DT at the tele-end, and 5.9<(DW/DT)<14.

In an embodiment of the projection apparatus and the projection lens of the invention, a focal length of the first lens group and a focal length of the second lens group are respectively F1 and F2, and 1<|F1/F2|<1.5.

In an embodiment of the projection apparatus and the projection lens of the invention, the projection lens further includes an aperture stop. The aperture stop is located between the ninth lens and the tenth lens.

In an embodiment of the projection apparatus and the projection lens of the invention, the first lens has a convex surface facing the screen side and a concave surface facing the image side, the second lens is a biconcave lens, the third lens has a convex surface facing the screen side and a concave surface facing the image side, the fourth lens is a biconvex lens, the fifth lens is a biconvex lens, the sixth lens is a biconcave lens, the seventh lens is a biconcave lens, the eighth lens has a convex surface facing the screen side and a concave surface facing the image side, the ninth lens has a convex surface facing the screen side and a concave surface facing the image side, and the tenth lens is a biconvex lens.

In an embodiment of the projection apparatus and the projection lens of the invention, the first lens group further includes an eleventh lens. A refractive power of the eleventh lens is positive, and the eleventh lens is disposed between the screen side and the first lens. The second lens group further includes a twelfth lens. A refractive power of the twelfth lens is positive, and the twelfth lens is disposed between the first lens group and the fourth lens.

In an embodiment of the projection apparatus and the projection lens of the invention, all of the first lens, the second lens, the third lens, the fourth lens, the fifth lens, the sixth lens, the seventh lens, the eighth lens, the ninth lens, the tenth lens, the eleventh lens, and the twelfth lens are spherical lenses.

In an embodiment of the projection apparatus and the projection lens of the invention, the first lens has a convex surface facing the screen side and a concave surface facing the image side, the second lens is a biconcave lens, the third lens has a convex surface facing the screen side and a concave surface facing the image side, the fourth lens has a convex surface facing the screen side and a plane surface facing the image side, the fifth lens is a biconvex lens, the sixth lens is a biconcave lens, the seventh lens is a biconcave lens, the eighth lens has a convex surface facing the screen side and a concave surface facing the image side, the ninth lens has a convex surface facing the screen side and a concave surface facing the image side, the tenth lens is a biconvex lens, and each of the eleventh lens and the twelfth lens is a biconvex lens.

Based on the above, the embodiments of the invention have at least one of the following advantages and effects. In the embodiments of the invention, focusing and/or zooming may be proceeded and image aberration may also be corrected by using the first lens group and the second lens group. Therefore, the projection lens may have advantages of small size, light weight, and good/favorable optical quality, and the projection apparatus using such projection lens may also have the advantages of small size, light weight, and good/favorable imaging quality.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
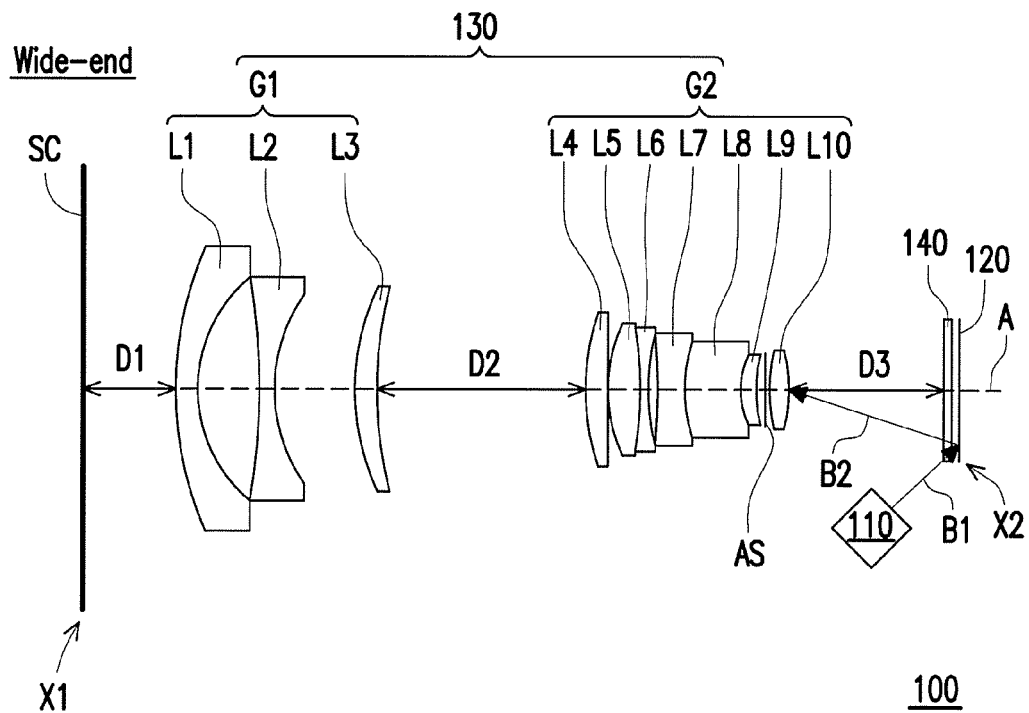
FIG. 1A and FIG. 1B are schematic diagrams of a projection apparatus respectively at a wide-end and a tele-end in the first embodiment of the invention.
Figure 1B:
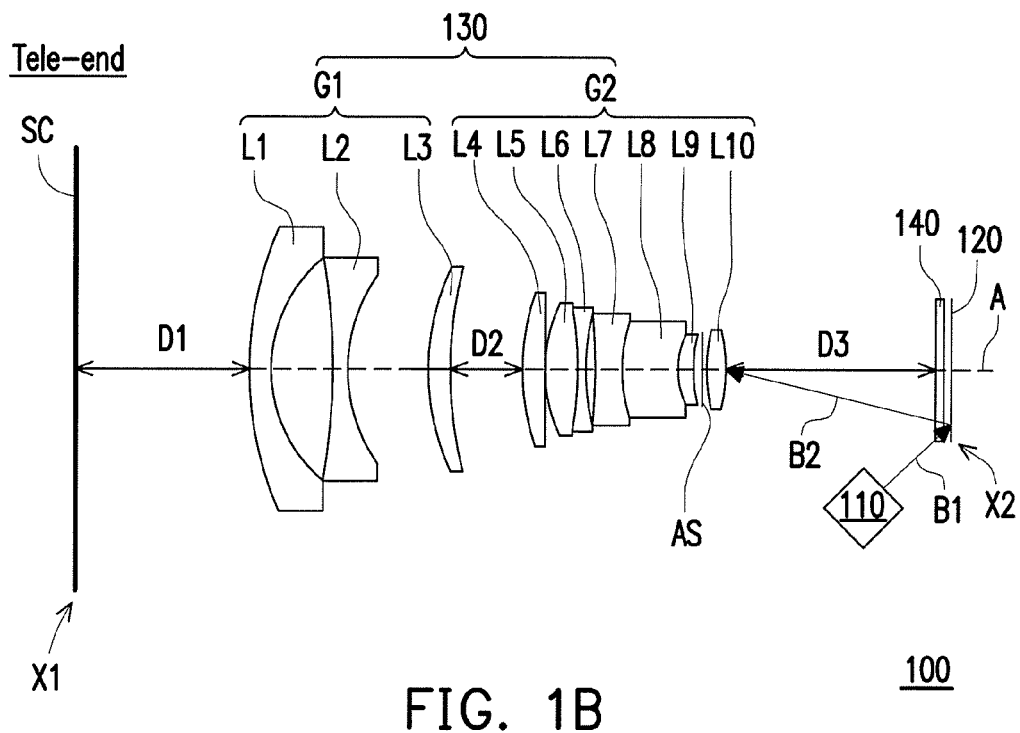

FIG. 1A and FIG. 1B are schematic diagrams of a projection apparatus respectively at a wide-end and a tele-end in the first embodiment of the invention. The so-called wide-end and tele-end refer to conditions where a focal length is adjusted to the longest and the shortest in the same projection lens. Referring to FIG. 1A and FIG. 1B, a projection apparatus 100 includes an illumination system 110, a light valve 120, and a projection lens 130. The illumination system 110 is adapted to provide an illuminating beam B1, and the illumination system 110 may be any optical systems adapted to provide the illuminating beam to the light valve 120. The light valve 120 is disposed on a transmitting path of the illumination beam B1, and the light valve 120 is adapted to convert the illumination beam B1 into an image beam B2. For instance, the light valve 120 may be a digital micro-mirror device (DMD), a liquid-crystal-on-silicon panel (LCOS panel) or other suitable spatial light modulators (SLM). The projection lens 130 is disposed on a transmitting path of the image beam B2 and between a screen side X1 and an image side X2, and receives the image beam B2 from the light valve 120 to further project the image beam B2 onto a screen SC, a wall or other objects on which images may be formed. In the embodiment, the screen side X1 is defined by a position of the screen SC, and the image side X2 is defined by a position of the light valve 120.

The projection lens 130 includes a first lens group G1 and a second lens group G2. The first lens group G1 has a negative refractive power, and the first lens group G1 includes a first lens L1, a second lens L2, and a third lens L3 arranged in sequence from the screen side X1 to the image side X2. Refractive powers of the first lens L1, the second lens L2, and the third lens L3 are respectively negative, negative, and positive. The second lens group G2 has a positive refractive power, and the second lens group G2 is disposed between the first lens group G1 and the image side X2. The second lens group G2 includes a fourth lens L4, a fifth lens L5, a sixth lens L6, a seventh lens L7, an eighth lens L8, a ninth lens L9, and a tenth lens L0 arranged in sequence from the screen side X1 to the image side X2. Refractive powers of the fourth lens L4, the fifth lens L5, the sixth lens L6, the seventh lens L7, the eighth lens L8, the ninth lens L9, and the tenth lens L10 are respectively positive, positive, negative, negative, negative, positive, and positive.

In the embodiment, the first lens L1 has a convex surface facing the screen side X1 and a concave surface facing the image side X2. In the embodiment, the second lens L2 is a biconcave lens. In the embodiment, the third lens L3 has a convex surface facing the screen side X1 and a concave surface facing the image side X2. In the embodiment, the fourth lens L4 is a biconvex lens. In the embodiment, the fifth lens L5 is a biconvex lens. In the embodiment, the sixth lens L6 is a biconcave lens. In the embodiment, the seventh lens L7 is a biconcave lens. In the embodiment, the eighth lens L8 has a convex surface facing the screen side X1 and a concave surface facing the image side X2. In the embodiment, the ninth lens L9 has a convex surface facing the screen side X1 and a concave surface facing the image side X2. In the embodiment, the tenth lens L0 is a biconvex lens. However, the invention is not limited to the above.

In the projection lens 130 of the embodiment, the first lens L1 is closest to the screen side X1. In the embodiment, by making the first lens L1 an aspheric lens, it not only helps correcting image aberration (e.g., spherical aberration, comatic aberration/coma, astigmatism field curvature, distortion, etc.), but also helps reducing a diameter of the first lens L1, so as to reduce a weight, a volume and a manufacturing cost of the projection lens 130.

Moreover, in the projection lens 130 of the embodiment, the tenth lens L10 is closest to the image side X2. By making the tenth lens L10 a spherical lens, it helps reducing the manufacturing cost of the projection lens 130 since the cost of the tenth lens L10 is less than the conventional molding glass. On the other hand, in the embodiment, all of the second lens L2, the third lens L3, the fourth lens L4, the fifth lens L5, the sixth lens L6, the seventh lens L7, the eighth lens L8, and the ninth lens L9 may be spherical lenses, so as to further reduce the overall manufacturing cost of the projection lens 130.

Furthermore, in the embodiment, the fifth lens L5 and the sixth lens L6 may form a cemented doublet lens, and the seventh lens L7, the eighth lens L8, and the ninth lens L9 may form a cemented triplet lens. Accordingly, other than correcting image aberration, it also helps reducing a total length of the second lens group G2, so as to further reduce the volume of the projection lens 130.

In the projection lens 130 of the embodiment, a distance between two adjacent lenses in the first lens group G1 is a fixed value (constant), and a distance between two adjacent lenses in the second lens group G2 is a fixed value (constant). That is to say, a distance between any two adjacent lenses in each of the lens groups does not change when the focal length of the projection lens 130 changes. Specifically, in the first lens group G1 of the embodiment, a distance between the first lens L1 and the second lens L2 is fixed, and a distance between the second lens L2 and the third lens L3 is fixed. In the second lens group G2 of the embodiment, a distance between the fourth lens L4 and the fifth lens L5 is fixed, and the rest may be deduced by analogy. Aforementioned distance refers to a straight line distance between centers of two adjacent lenses along an optical axis A of the projection lens 130.

On the other hand, in the embodiment, a distance D1 between the first lens group G1 and the screen SC, a distance D2 between the first lens group G1 and the second lens group G2, and a distance D3 between the second lens group G2 and the light valve 120 are variable. Specifically, in the embodiment, the first lens group G1 and the second lens group G2 are adapted to move between the screen side X1 and the image side X2, so that the projection lens 130 may switch between a wide-end in FIG. 1A and a tele-end in FIG. 1B for focusing and/or zooming. The projection lens 130 of the embodiment may be a true zoom lens. That is to say, positions of the first lens group G1 and the second lens group G2 may be adjusted while the projection lens 130 switches between the wide-end and the tele-end, such that an image definition/resolution may be adjusted without performing additional steps for focusing. In the embodiment, the distance D2 between the first lens group G1 and the second lens group G2 at the wide-end is represented by DW, the distance D2 between the first lens group G1 and the second lens group G2 at the tele-end is represented by DT, and $5.9<(DW/DT)<14$. Moreover, in the embodiment, a focal length of the first lens group G1 is F1, a focal length of the second lens group G2 is F2, and $1<|F1/F2|<1.5$. However, the invention is not limited thereto.

In the embodiment, the projection lens 130 may further includes an aperture stop AS, and the aperture stop AS is disposed between the ninth lens L9 and the tenth lens L10. Moreover, in the embodiment, a cover glass 140 may be disposed between the second lens group G2 and the light valve 120 to protect the light valve 120.

In view of the above, through the first lens group G1 and the second lens group G2, the embodiment adjusts the focal length of the projection lens 130 and corrects image aberration (e.g., spherical aberration, comatic aberration/coma, astigmatism field curvature, distortion, etc.), such that the projection lens 130 may have advantages of small size, light weight, and good/favorable optical quality. Accordingly, the projection apparatus 100 using such projection lens 130 may also have the advantages of small size, light weight, and good/favorable projecting quality.

The following content will provide an embodiment of the projection lens 130. However, the invention is not limited to the quantitative data listed in the following content. It should be known to those ordinary skilled in the art that various modifications and variations may be made to the invention without departing from the scope or spirit of the invention.

TABLE 1

| Element | Surface | Radius of Curvature (mm) | Distance (mm) | Refractive Index | Abbe Number |
|---|---|---|---|---|---|
| First Lens L1 | S1 | 63.25 | 4.95 | 1.531 | 56.04 |
| | S2 | 21.43 | 10.48 | | |
| Second Lens L2 | S3 | −256.58 | 2.7 | 1.517 | 52.43 |
| | S4 | 32.55 | 10.83 | | |
| Third Lens L3 | S5 | 44.68 | 6.14 | 1.805 | 25.43 |
| | S6 | 94.64 | D2 | | |
| Fourth Lens L4 | S7 | 77.43 | 4.72 | 1.743 | 49.34 |
| | S8 | −77.43 | 0.1 | | |
| Fifth Lens L5 | S9 | 31.89 | 6.72 | 1.603 | 65.44 |
| Sixth Lens L6 | S10 | −40.97 | 5.37 | 1.834 | 37.16 |
| | S11 | 383.33 | 0.6 | | |
| Seventh Lens L7 | S12 | −152.78 | 8 | 1.596 | 32.24 |
| Eighth Lens L8 | S13 | 33.14 | 6.2 | 1.805 | 25.43 |
| Ninth Lens L9 | S14 | 14.8 | 2.46 | 1.618 | 63.33 |
| | S15 | 24.37 | 2.08 | | |
| Aperture Stop AS | S16 | ∞ | 0.6 | — | — |
| Tenth Lens L10 | S17 | 52.48 | 5.9 | 1.772 | 49.6 |
| | S18 | −35.74 | D3 | | |
| Cover Glass 140 | S19 | ∞ | 1.05 | 1.487 | 70.44 |
| | S20 | ∞ | 0.7 | | |
| Light Valve 120 | S21 | ∞ | — | — | — |

Referring to FIG. 1A and Table 1, Table 1 lists surfaces of the first lens L1 to the tenth lens L0 and the cover glass 140. Specifically, the surface S1 is a surface of the first lens L1 facing the screen side X1, the surface S2 is a surface of the first lens L1 facing the image side X2, the surface S16 is a plane where the aperture stop AS is located, the surface S21 is a surface of the light valve 120 facing the screen side X1, and the rest may be deduced by analogy. Further, "Distance" as listed in Table 1 refers to a straight line distance between two adjacent surfaces along the optical axis A. Specifically, a distance corresponding to the surface S1 refers to a straight line distance from the surface S1 to the surface S2 along the optical axis A, a distance corresponding to the surface S2 refers to a straight line distance from the surface S2 to the surface S3 along the optical axis A, and the rest may be deduced by analogy. In addition, "Radius of Curvature" as listed in Table 1 being infinity (∞) refers to that the corresponding surface is a plane.

In the embodiment, the first lens L1 may be the aspheric lens. An equation of the aspheric lens is as shown below:

$$X = \frac{Y^2}{R\left(1 + \sqrt{1 - (1+k) \times Y^2/R^2}\right)} + A_2 Y^2 + A_4 Y^4 + A_6 Y^6 + A_8 Y^8 + A_{10} Y^{10} + A_{12} Y^{12} + A_{14} Y^{14}$$

In the above equation, X is an offset amount (sag) in a direction of the optical axis A. R is a radius of osculating sphere, that is, the radius of curvature near the optical axis A (e.g., the radius of curvatures as listed in Table 1). k is a quadratic surface coefficient (conic). Y is an aspheric height, which refers to a height from a center of the lens to an edge of the lens, and coefficients $A_2$, $A_4$, $A_6$, $A_8$, $A_{10}$, $A_{12}$, and $A_{14}$ are aspheric coefficients. In the embodiment, the coefficient $A_2$ is 0. Table 2 below lists parameter values of the surfaces S1 and S2 of the first lens L1.

TABLE 2

| | S1 | S2 |
|---|---|---|
| k | 0.823 | −0.04 |
| $A_4$ | 4.18E−06 | 3.21E−06 |
| $A_6$ | −1.01E−08 | −1.84E−08 |
| $A_8$ | 8.84E−12 | 4.09E−12 |
| $A_{10}$ | 5.31E−15 | −1.17E−13 |
| $A_{12}$ | −2.01E−17 | 3.98E−16 |
| $A_{14}$ | 1.42E−20 | −7.50E−19 |

Figure 2:
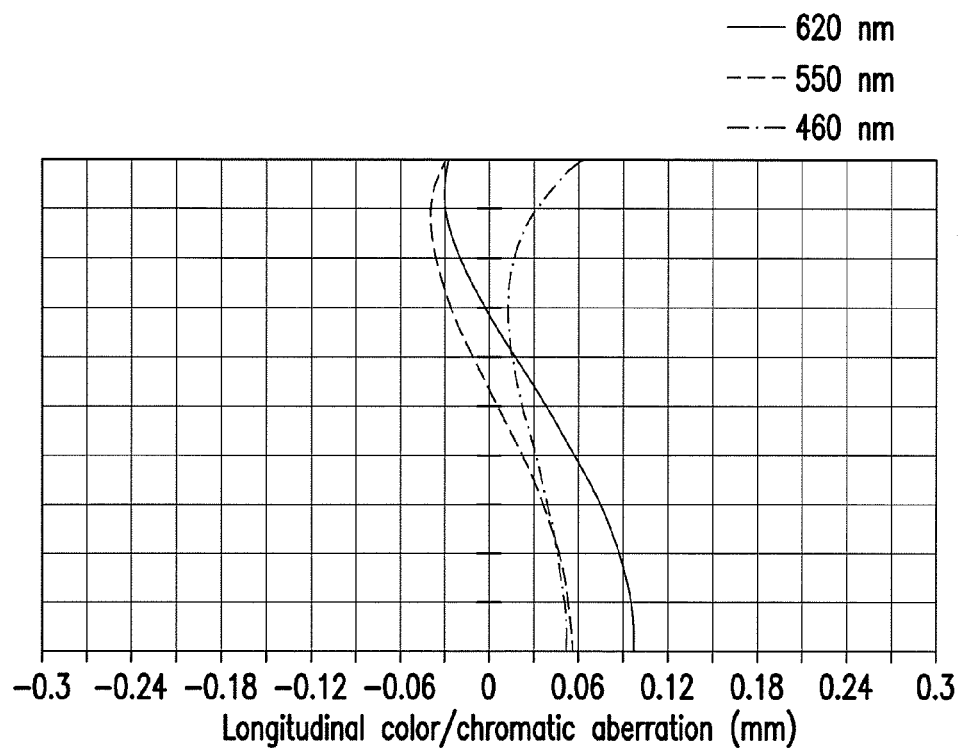
FIG. 2 is a longitudinal color/chromatic aberration chart of the projection lens of the projection apparatus in the first embodiment of the invention.
Figure 3:
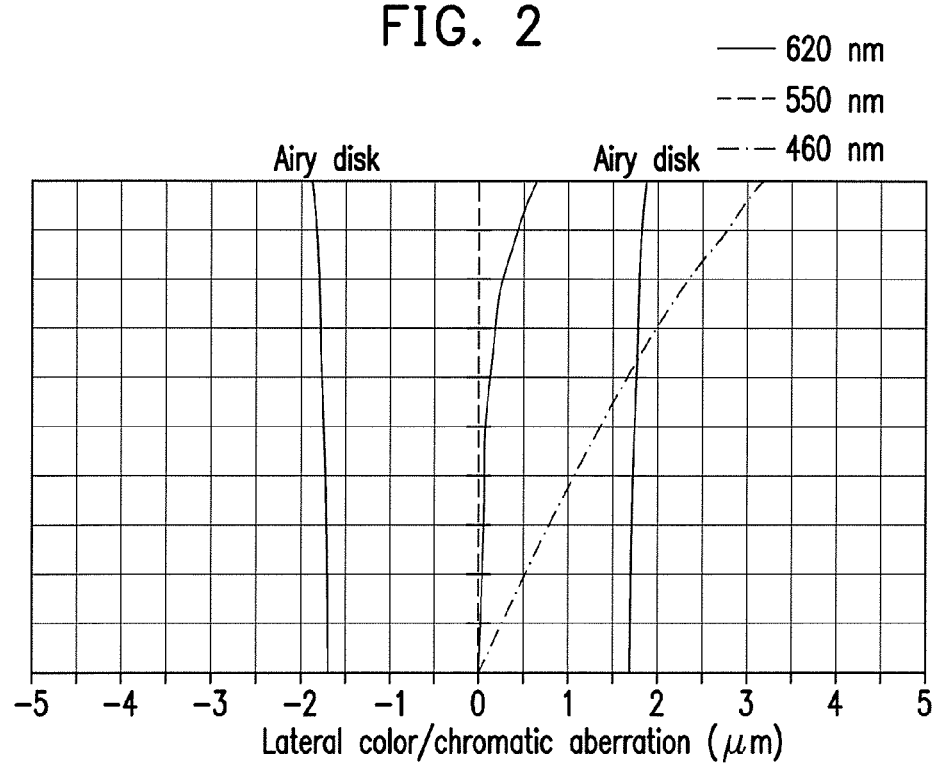
FIG. 3 is a lateral color/chromatic aberration chart of the projection lens of the projection apparatus in the first embodiment of the invention.
Figure 4:
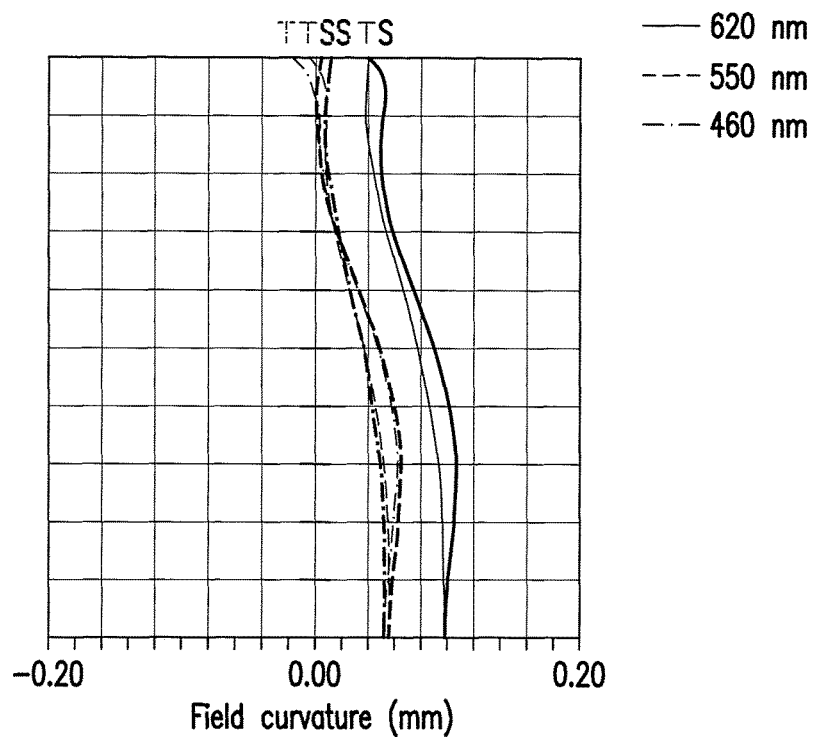
FIG. 4 is an astigmatism field curvature chart of the projection lens of the projection apparatus in the first embodiment of the invention.
Figure 5:
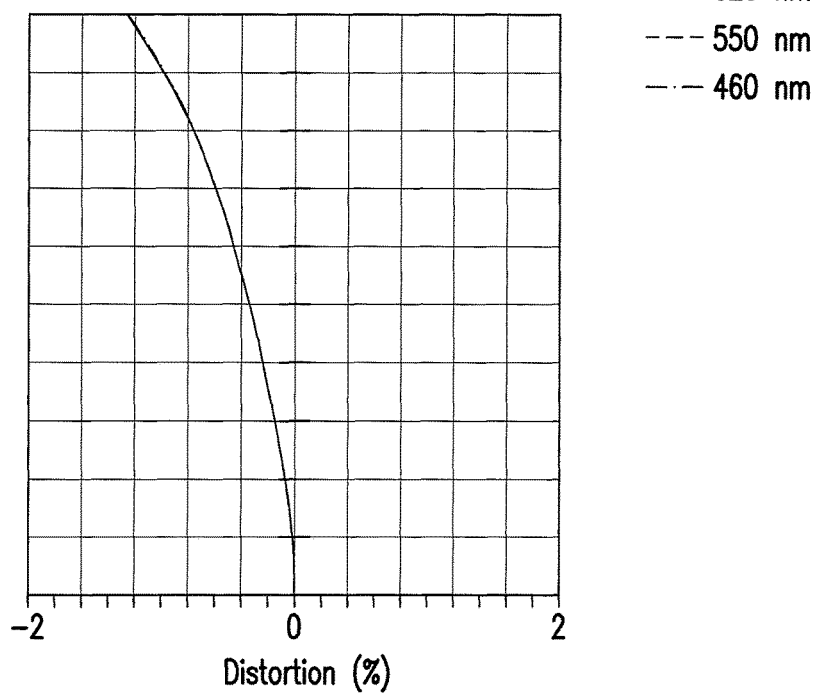
FIG. 5 is a distortion chart of the projection lens of the projection apparatus in the first embodiment of the invention.
Figure 6:
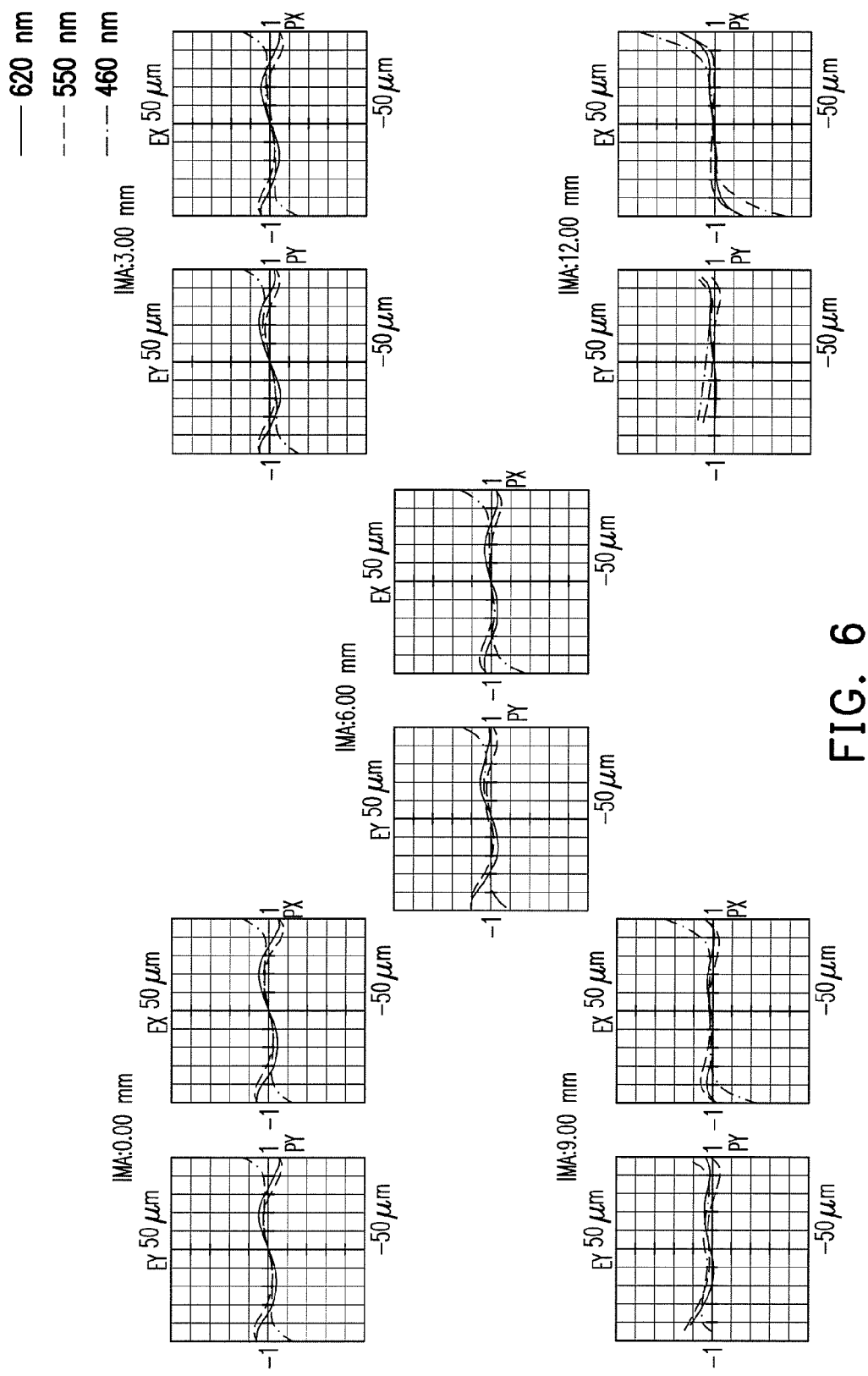
FIG. 6 is a ray fan plot chart of the projection lens of the projection apparatus in the first embodiment of the invention.

FIG. 2 is a longitudinal color/chromatic aberration chart of the projection lens of the projection apparatus in the first embodiment of the invention. FIG. 3 is a lateral color/chromatic aberration chart of the projection lens of the projection apparatus in the first embodiment of the invention. FIG. 4 is an astigmatism field curvature chart of the projection lens of the projection apparatus in the first embodiment of the invention. FIG. 5 is a distortion chart of the projection lens of the projection apparatus in the first embodiment of the invention. FIG. 6 is a ray fan plot chart of the projection lens of the projection apparatus in the first embodiment of the invention. The graphics as illustrated in FIG. 2 to FIG. 6 all falls within the standard range, thereby validating that the projection lens 130 of the embodiment may indeed provide good/favorable optical quality.

Figure 7A:
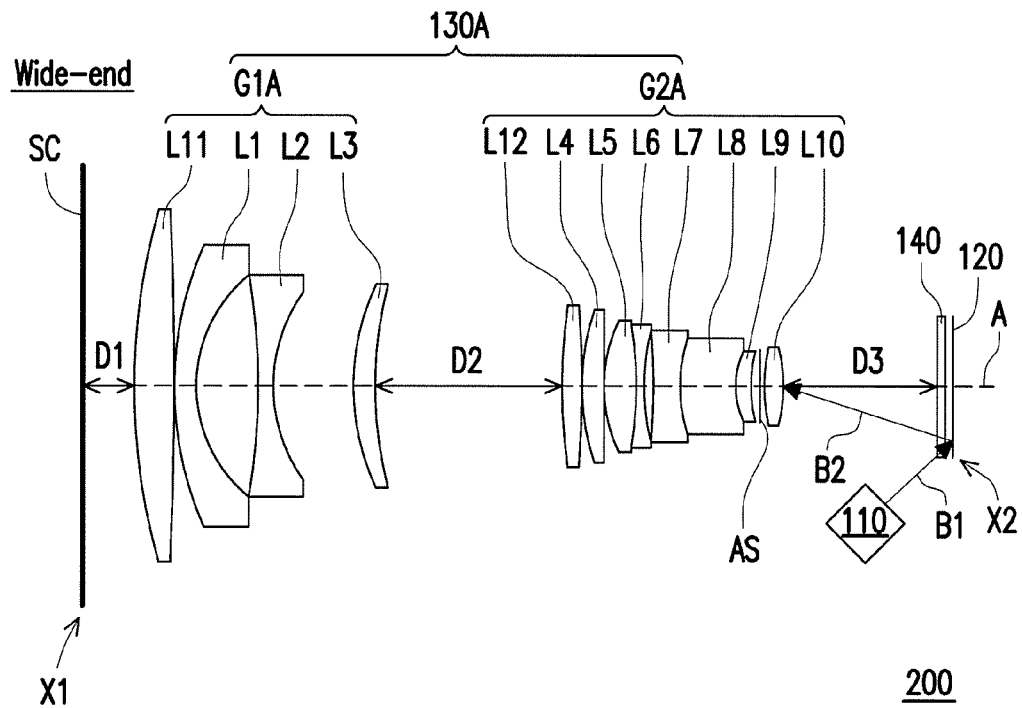
FIG. 7A and FIG. 7B are schematic diagrams of a projection apparatus respectively at a wide-end and a tele-end in the second embodiment of the invention.
Figure 7B:
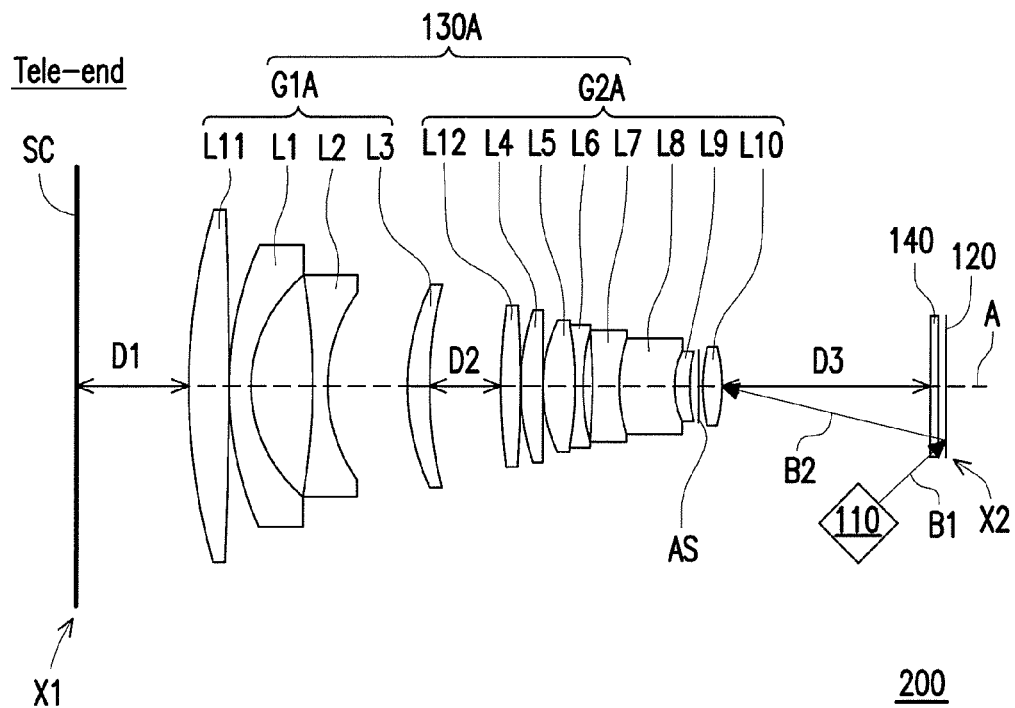

FIG. 7A and FIG. 7B are schematic diagrams of a projection apparatus respectively at a wide-end and a tele-end in the second embodiment of the invention. Referring to FIG. 7A and FIG. 7B, a projection apparatus 200 is similar to the projection apparatus 100 of FIG. 1A and FIG. 1B, wherein the same or similar elements are indicated by the same or similar reference numbers, which are not repeated hereinafter. A major difference between the projection apparatus 200 and the projection apparatus 100 is that, in a projection lens 130A, a first lens group G1A further includes an eleventh lens L1, and a second lens group G2A further includes a twelfth lens L12. In the embodiment, a refractive power of the eleventh lens L11 is positive, and the eleventh lens L1 is disposed between the screen side X1 and the first lens L1. In the embodiment, a refractive power of the twelfth lens L12 is positive, and the twelfth lens L12 is disposed between the first lens group G1A and the fourth lens L4.

In the projection lens 130A of the embodiment, the eleventh lens L1 is closest to the screen side X1, and the twelfth lens L12 is a lens closest to the first lens group G1A in the second lens group G2A. Therefore, the distance D1 between the first lens group G1A and the screen SC of the embodiment is a straight line distance from the eleventh lens L11 to the screen SC along the optical axis A, and the distance D2 between the first lens group G1A and the second lens group G2A is a straight line distance from the twelfth lens L12 to the third lens L3 along the optical axis A.

In the embodiment, the disposition of the eleventh lens L11 and the twelfth lens L12 helps correct image aberration, and thus the first lens L1 of the embodiment does not have to be the aspheric lens. More specifically, in the embodiment, all of the first lens L1, the second lens L2, the third lens L3, the fourth lens L4, the fifth lens L5, the sixth lens L6, the seventh lens L7, the eighth lens L8, the ninth lens L9, the tenth lens L10, the eleventh lens L11, and the twelfth lens L12 may be spherical lenses. As such, the manufacturing cost of the projection lens 130A may be reduced.

In view of the above, in the embodiment, in the circumstance where the first lens L1 is not the aspheric lens, the astigmatism and the distortion may be effectively improved by additionally disposing two spherical lenses (the eleventh lens L11 and the twelfth lens L12), so that the projection lens 130 may provide good/favorable optical quality.

In the embodiment, the first lens L1 has a convex surface facing the screen side X1 and a concave surface facing the image side X2. In the embodiment, the second lens L2 is a biconcave lens. In the embodiment, the third lens L3 has a convex surface facing the screen side X1 and a concave surface facing the image side X2. In the embodiment, the fourth lens L4 has a convex surface facing the screen side X1 and a plane surface facing the image side X2. In the embodiment, the fifth lens L5 is a biconvex lens. In the embodiment, the sixth lens L6 is a biconvex lens. In the embodiment, the seventh lens L7 is a biconcave lens. In the embodiment, the eighth lens L8 has a convex surface facing the screen side X1 and a concave surface facing the image side X2. In the embodiment, the ninth lens L9 has a convex surface facing the screen side X1 and a concave surface facing the image side X2. In the embodiment, the tenth lens L10 is a biconvex lens. In the embodiment, each of the eleventh lens L11 and the twelfth lens L12 is a biconvex lens. However, the invention is not limited thereto.

The following content will provide an embodiment of the projection lens 130A. However, the invention is not limited to the quantitative data listed in the following content. It should be known to those ordinary skilled in the art that various modifications and variations may be made to the invention without departing from the scope or spirit of the invention.

TABLE 3

| Element | Surface | Radius of Curvature (mm) | Distance (mm) | Refractive Index | Abbe Number |
|---|---|---|---|---|---|
| Eleventh | S1 | 104.03 | 6.85 | 1.487 | 70.23 |
| Lens L11 | S2 | −777.3 | 0.3 | | |
| First Lens L1 | S3 | 65.95 | 3.24 | 1.487 | 70.23 |
| | S4 | 25.02 | 10.53 | | |
| Second Lens L2 | S5 | −118.8 | 2.2 | 1.603 | 60.64 |
| | S6 | 29.66 | 13.71 | | |
| Third Lens L3 | S7 | 42.92 | 3.55 | 1.728 | 28.46 |
| | S8 | 75.64 | D2 | | |
| Twelfth Lens L12 | S9 | 110.75 | 3.06 | 1.772 | 49.6 |
| | S10 | −249.06 | 0.1 | | |
| Fourth Lens L4 | S11 | 42.86 | 3.9 | 1.772 | 49.6 |
| | S12 | 1.0E+18 | 0.1 | | |
| Fifth Lens L5 | S13 | 31.65 | 5.38 | 1.497 | 81.55 |
| Sixth Lens L6 | S14 | −42.83 | 1.24 | 1.673 | 32.1 |
| | S15 | 42.83 | 1.27 | | |
| Seventh Lens L7 | S16 | −404.36 | 4.77 | 1.516 | 64.14 |
| Eighth Lens L8 | S17 | 33.21 | 8.97 | 1.762 | 26.51 |
| Ninth Lens L9 | S18 | 14.34 | 2.66 | 1.618 | 63.33 |
| | S19 | 23.38 | 1.49 | | |
| Aperture Stop AS | S20 | ∞ | 0.89 | — | — |
| Tenth Lens L10 | S21 | 41.37 | 2.86 | 1.786 | 44.2 |
| | S22 | −41.37 | D3 | | |
| Cover Glass 140 | S23 | ∞ | 1.05 | 1.487 | 70.44 |
| | S24 | ∞ | 0.7 | | |
| Light Valve 120 | S25 | ∞ | — | — | — |

Figure 8:
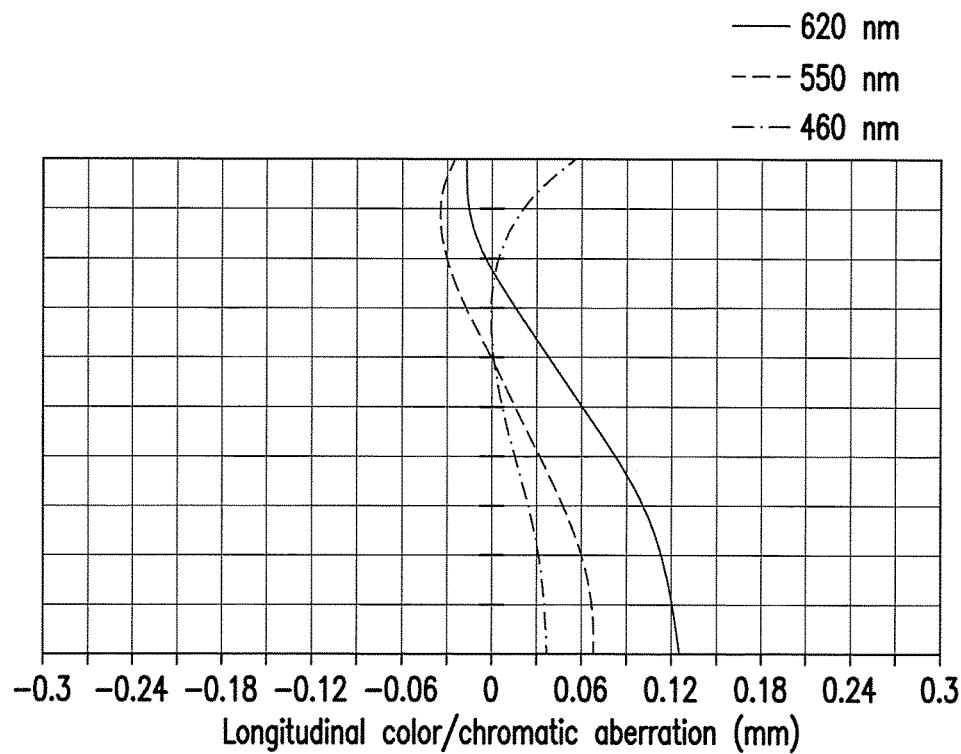
FIG. 8 is a longitudinal color/chromatic aberration chart of the projection lens of the projection apparatus in the second embodiment of the invention.
Figure 9:
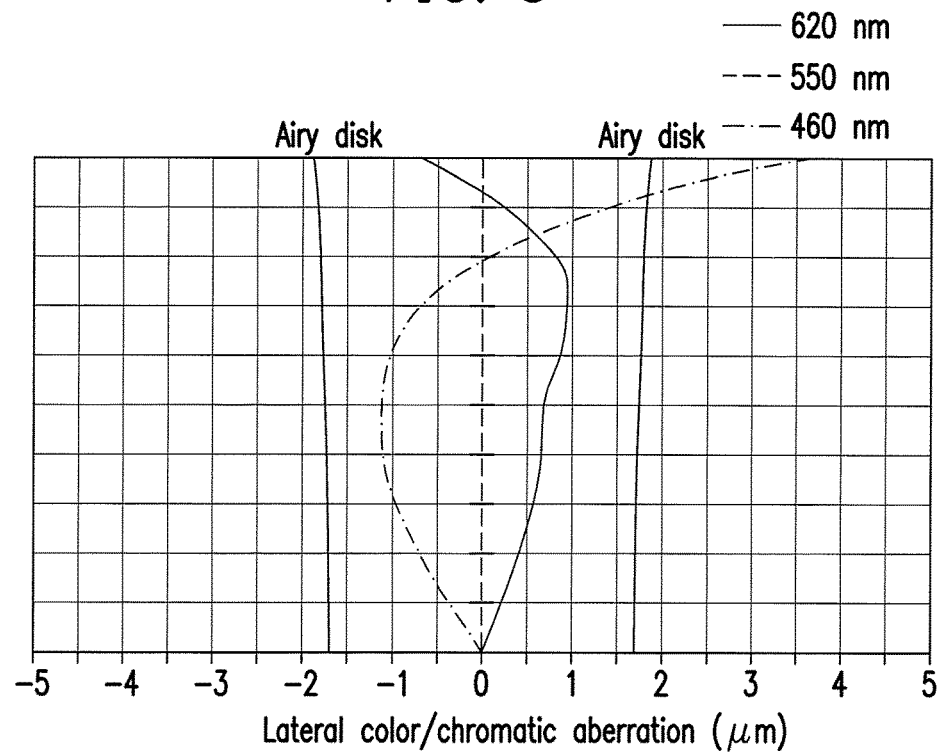
FIG. 9 is a lateral color/chromatic aberration chart of the projection lens of the projection apparatus in the second embodiment of the invention.
Figure 10:
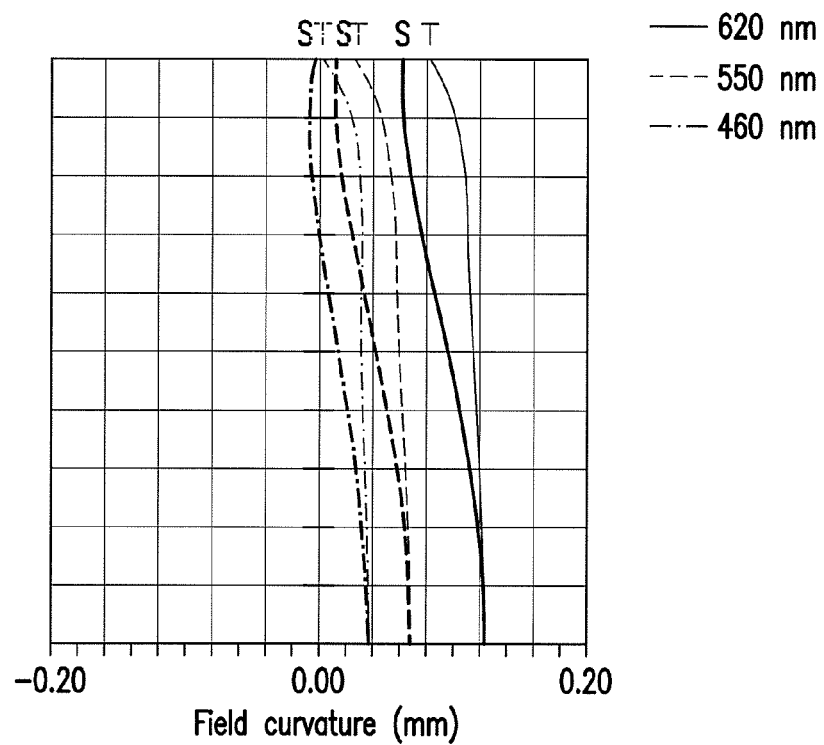
FIG. 10 is an astigmatism field curvature chart of the projection lens of the projection apparatus in the second embodiment of the invention.
Figure 11:
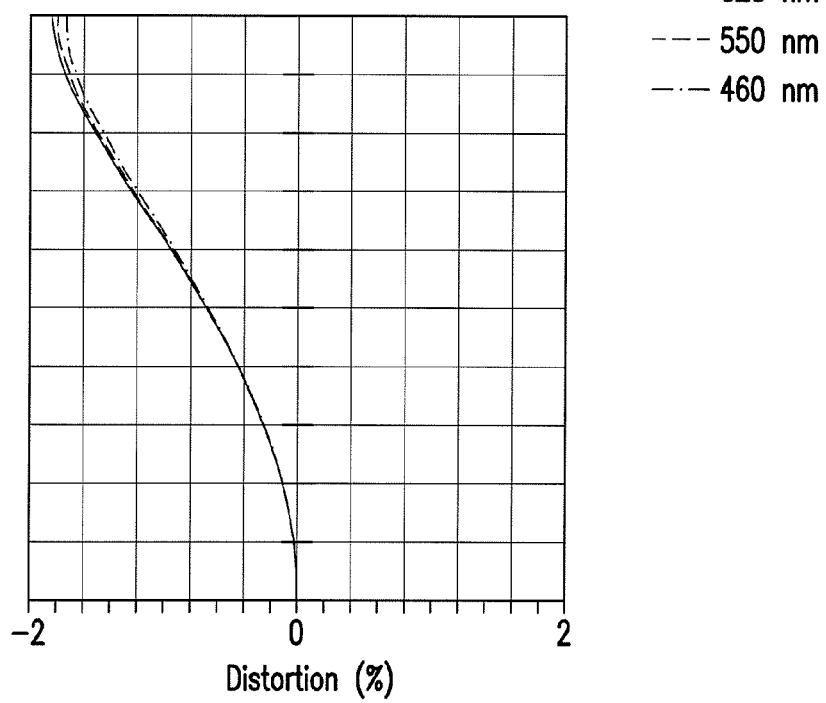
FIG. 11 is a distortion chart of the projection lens of the projection apparatus in the second embodiment of the invention.
Figure 12:
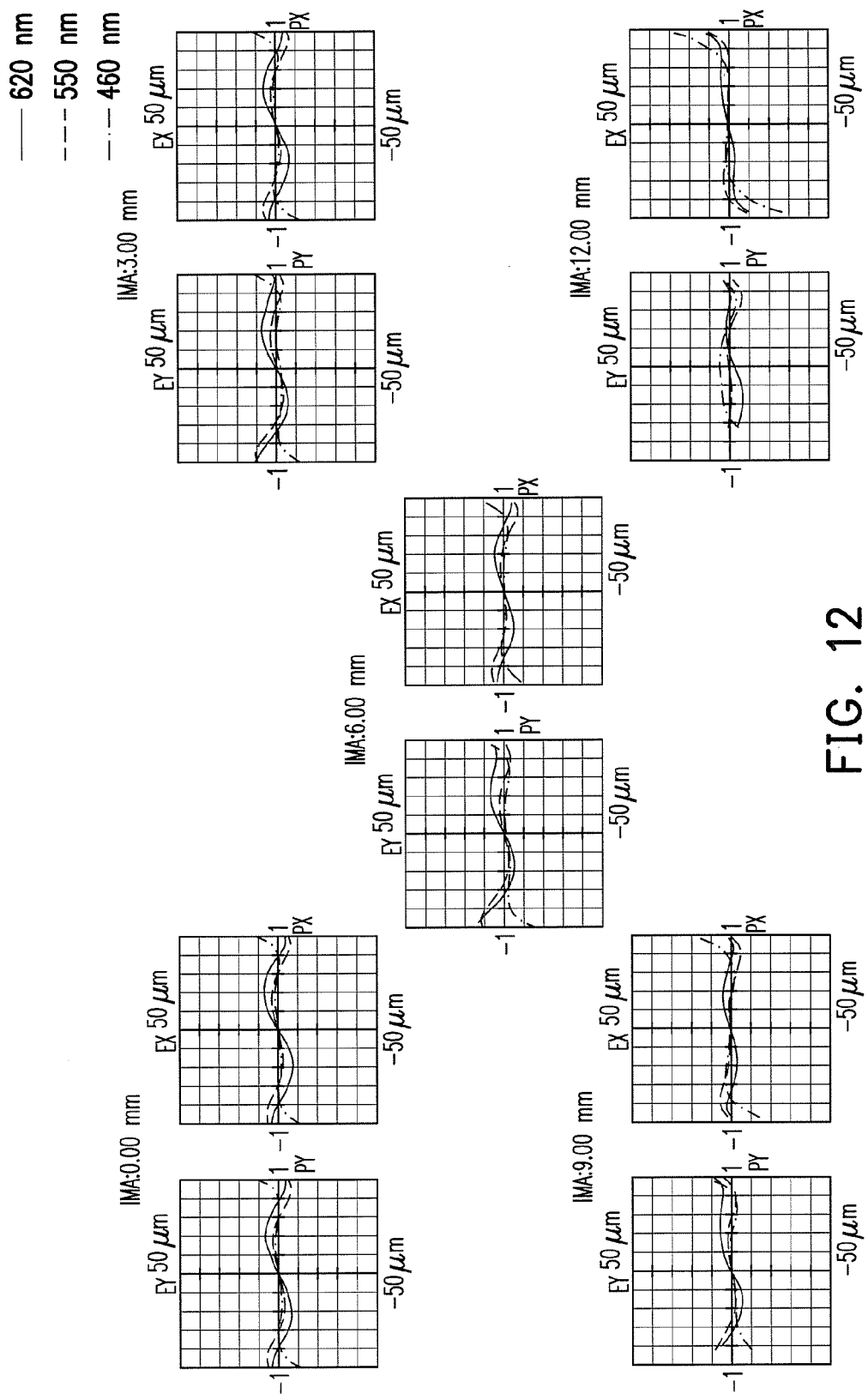
FIG. 12 is a ray fan plot chart of the projection lens of the projection apparatus in the second embodiment of the invention.

FIG. 8 is a longitudinal color/chromatic aberration chart of the projection lens of the projection apparatus in the second embodiment of the invention. FIG. 9 is a lateral color/chromatic aberration chart of the projection lens of the projection apparatus in the second embodiment of the invention. FIG. 10 is an astigmatism field curvature chart of the projection lens of the projection apparatus in the second embodiment of the invention. FIG. 11 is a distortion chart of the projection lens of the projection apparatus in the second embodiment of the invention. FIG. 12 is a ray fan plot chart of the projection lens of the projection apparatus in the second embodiment of the invention. The graphics as illustrated in FIG. 8 to FIG. 12 all falls within the standard range, thereby validating that the projection lens 130A of the embodiment may indeed provide good/favorable optical quality.

In summary, the embodiments of the invention have at least one of the following advantages and effects. In the embodiments of the invention, focusing and/or zooming may be proceeded and image aberration may also be corrected by using the first lens group and the second lens group. Therefore, the projection lens may have advantages of small size, light weight, and good/favorable optical quality, and the projection apparatus using such projection lens may also have the advantages of small size, light weight, and good/favorable projecting quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:
1. A projection apparatus, comprising:
an illumination system, adapted to provide an illumination beam;

a light valve, disposed on a transmitting path of the illumination beam, and adapted to convert the illumination beam into an image beam; and a projection lens, disposed on a transmitting path of the image beam and between a screen side and an image side, and the projection lens comprising:
   a first lens group, having a negative refractive power, and comprising a first lens, a second lens, and a third lens arranged in sequence from the screen side to the image side, wherein refractive powers of the first lens, the second lens, and the third lens are respectively negative, negative, and positive; and
   a second lens group, having a positive refractive power, disposed between the first lens group and the image side, and comprising a fourth lens, a fifth lens, a sixth lens, a seventh lens, an eighth lens, a ninth lens, and a tenth lens arranged in sequence from the screen side to the image side, wherein refractive powers of the fourth lens, the fifth lens, the sixth lens, the seventh lens, the eighth lens, the ninth lens, and the tenth lens are respectively positive, positive, negative, negative, negative, positive, and positive, wherein a focal length of the first lens group and a focal length of the second lens group are respectively F1 and F2, and $1 <|F1/F2|<1.5$.

2. The projection apparatus of claim 1, wherein the first lens is an aspheric lens, and the second lens, the third lens, the fourth lens, the fifth lens, the sixth lens, the seventh lens, the eighth lens, the ninth lens, and the tenth lens are spherical lenses.

3. The projection apparatus of claim 1, wherein the fifth lens and sixth lens form a cemented doublet lens, and the seventh lens, the eighth lens, and the ninth lens form a cemented triplet lens.

4. The projection apparatus of claim 1, wherein the first lens group and the second lens group are adapted to move between the screen side and the image side so that the projection lens switches between a wide-end and a tele-end, a distance between the first lens group and the second lens group is DW at the wide-end and is DT at the tele-end, and $5.9 <(DW/DT)<14$.

5. The projection apparatus of claim 1, wherein the projection lens further comprises an aperture stop, the aperture stop is located between the ninth lens and the tenth lens.

6. The projection apparatus of claim 1, wherein the first lens has a convex surface facing the screen side and a concave surface facing the image side, the second lens is a biconcave lens, the third lens has a convex surface facing the screen side and a concave surface facing the image side, the fourth lens is a biconvex lens, the fifth lens is a biconvex lens, the sixth lens is a biconcave lens, the seventh lens is a biconcave lens, the eighth lens has a convex surface facing the screen side and a concave surface facing the image side, the ninth lens has a convex surface facing the screen side and a concave surface facing the image side, and the tenth lens is a biconvex lens.

7. The projection apparatus of claim 1, wherein the first lens group further comprises an eleventh lens having a positive refractive power and disposed between the screen side and the first lens, and the second lens group further comprises a twelfth lens having a positive refractive power and disposed between the first lens group and the fourth lens.

8. The projection apparatus of claim 7, wherein all of the first lens, the second lens, the third lens, the fourth lens, the fifth lens, the sixth lens, the seventh lens, the eighth lens, the ninth lens, the tenth lens, the eleventh lens, and the twelfth lens are spherical lenses.

9. The projection apparatus of claim 7, wherein the first lens has a convex surface facing the screen side and a concave surface facing the image side, the second lens is a biconcave lens, the third lens has a convex surface facing the screen side and a concave surface facing the image side, the fourth lens has a convex surface facing the screen side and a plane surface facing the image side, the fifth lens is a biconvex lens, the sixth lens is a biconcave lens, the seventh lens is a biconcave lens, the eighth lens has a convex surface facing the screen side and a concave surface facing the image side, the ninth lens has a convex surface facing the screen side and a concave surface facing the image side, the tenth lens is a biconvex lens, and each of the eleventh lens and the twelfth lens is a biconvex lens.

10. A projection lens, adapted to be disposed between a screen side and an image side, and the projection lens comprising:
   a first lens group, having a negative refractive power, and comprising a first lens, a second lens, and a third lens arranged in sequence from the screen side to the image side, wherein refractive powers of the first lens, the second lens, and the third lens are respectively negative, negative, and positive; and
   a second lens group, having a positive refractive power, disposed between the first lens group and the image side, and comprising a fourth lens, a fifth lens, a sixth lens, a seventh lens, an eighth lens, a ninth lens, and a tenth lens arranged in sequence from the screen side to the image side, wherein refractive powers of the fourth lens, the fifth lens, the sixth lens, the seventh lens, the eighth lens, the ninth lens, and the tenth lens are respectively positive, positive, negative, negative, negative, positive, and positive, wherein a focal length of the first lens group and a focal length of the second lens group are respectively F1 and F2, and $1<|F1/F2|<1.5$.

11. The projection lens of claim 10, wherein the first lens is an aspheric lens, and the second lens, the third lens, the fourth lens, the fifth lens, the sixth lens, the seventh lens, the eighth lens, the ninth lens, and the tenth lens are spherical lenses.

12. The projection lens of claim 10, wherein the fifth lens and sixth lens form a cemented doublet lens, and the seventh lens, the eighth lens, and the ninth lens form a cemented triplet lens.

13. The projection lens of claim 10, wherein the first lens group and the second lens group are adapted to move between the screen side and the image side so that the projection lens switches between a wide-end and a tele-end, a distance between the first lens group and the second lens group is DW at the wide-end and is DT at the tele-end, and $5.9<(DW/DT)<14$.

14. The projection lens of claim 10, further comprising:
   an aperture stop, located between the ninth lens and the tenth lens.

15. The projection lens of claim 10, wherein the first lens has a convex surface facing the screen side and a concave surface facing the image side, the second lens is a biconcave lens, the third lens has a convex surface facing the screen side and a concave surface facing the image side, the fourth lens is a biconvex lens, the fifth lens is a biconvex lens, the sixth lens is a biconcave lens, the seventh lens is a biconcave lens, the eighth lens has a convex surface facing the screen side and a concave surface facing the image side, the ninth lens has a convex surface facing the screen side and a concave surface facing the image side, and the tenth lens is a biconvex lens.

16. The projection lens of claim 10, wherein the first lens group further comprises an eleventh lens having a positive refractive power and disposed between the screen side and the first lens, and the second lens group further comprises a twelfth lens having a positive refractive power and disposed between the first lens group and the fourth lens.

17. The projection lens of claim 16, wherein all of the first lens, the second lens, the third lens, the fourth lens, the fifth lens, the sixth lens, the seventh lens, the eighth lens, the ninth lens, the tenth lens, the eleventh lens, and the twelfth lens are spherical lenses.

18. The projection lens of claim 16, wherein the first lens has a convex surface facing the screen side and a concave surface facing the image side, the second lens is a biconcave lens, the third lens has a convex surface facing the screen side and a concave surface facing the image side, the fourth lens has a convex surface facing the screen side and a plane surface facing the image side, the fifth lens is a biconvex lens, the sixth lens is a biconcave lens, the seventh lens is a biconcave lens, the eighth lens has a convex surface facing the screen side and a concave surface facing the image side, the ninth lens has a convex surface facing the screen side and a concave surface facing the image side, the tenth lens is a biconvex lens, and each of the eleventh lens and the twelfth lens is a biconvex lens.

19. A projection apparatus, comprising:
an illumination system, adapted to provide an illumination beam;
a light valve, disposed on a transmitting path of the illumination beam, and adapted to convert the illumination beam into an image beam; and
a projection lens, disposed on a transmitting path of the image beam and between a screen side and an image side, and the projection lens comprising:
a first lens group, having a negative refractive power, and comprising a first lens, a second lens, and a third lens arranged in sequence from the screen side to the image side, wherein refractive powers of the first lens, the second lens, and the third lens are respectively negative, negative, and positive; and
a second lens group, having a positive refractive power, disposed between the first lens group and the image side, and comprising a fourth lens, a fifth lens, a sixth lens, a seventh lens, an eighth lens, a ninth lens, and a tenth lens arranged in sequence from the screen side to the image side, wherein refractive powers of the fourth lens, the fifth lens, the sixth lens, the seventh lens, the eighth lens, the ninth lens, and the tenth lens are respectively positive, positive, negative, negative, negative, positive, and positive, wherein the first lens group further comprises an eleventh lens having a positive refractive power and disposed between the screen side and the first lens, and the second lens group further comprises a twelfth lens having a positive refractive power and disposed between the first lens group and the fourth lens.

20. A projection lens, adapted to be disposed between a screen side and an image side, and the projection lens comprising:
a first lens group, having a negative refractive power, and comprising a first lens, a second lens, and a third lens arranged in sequence from the screen side to the image side, wherein refractive powers of the first lens, the second lens, and the third lens are respectively negative, negative, and positive; and
a second lens group, having a positive refractive power, disposed between the first lens group and the image side, and comprising a fourth lens, a fifth lens, a sixth lens, a seventh lens, an eighth lens, a ninth lens, and a tenth lens arranged in sequence from the screen side to the image side, wherein refractive powers of the fourth lens, the fifth lens, the sixth lens, the seventh lens, the eighth lens, the ninth lens, and the tenth lens are respectively positive, positive, negative, negative, negative, positive, and positive, wherein the first lens group further comprises an eleventh lens having a positive refractive power and disposed between the screen side and the first lens, and the second lens group further comprises a twelfth lens having a positive refractive power and disposed between the first lens group and the fourth lens.

* * * * *